*B. T. Loomis,*

*Expanding Die.*

N° 67,993.  Patented Aug. 20, 1867.

Witnesses
Theo Tusche
J. A. Service

Inventor
B T Loomis
Per Munn & Co
Attorneys

United States Patent Office.

B. T. LOOMIS, OF NEW YORK, N. Y.

Letters Patent No. 67,993, dated August 20, 1867.

IMPROVED EXPANDING DIE.

The Schedule referred to in these Letters Patent and making part of the same.

TO ALL WHOM IT MAY CONCERN:

Be it known that I, B. T. LOOMIS, of 495 Broadway, city, county, and State of New York, have invented a new and improved Expanding Die; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved expanding die, so constructed that it may be adjusted to cut a screw-thread upon bolts or pipes of different sizes; and it consists of the combination of the dove-tailed cutters, interior slotted tube, and cutter-seat with each other, and in the combination of the operating band with the interior tube and with the cutter-seat, the whole being constructed and arranged as hereinafter more fully described.

Figure 1:
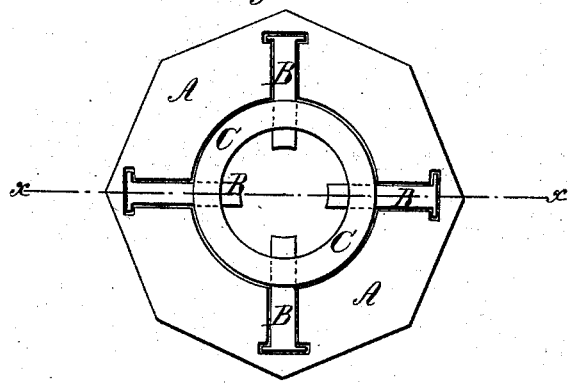
Figure 1 is a face view of my improved die.
Figure 2:
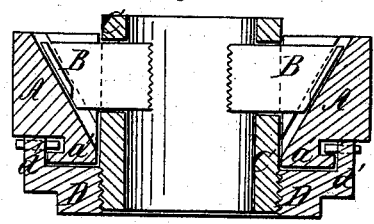
Figure 2 is a detail sectional view of the same, taken through the line $x\ x$, fig. 1.

A is the cutter-seat, in the face and interior surface of which are formed inclined dove-tailed grooves for the reception of the inclined flanged or dove-tailed heads of the cutters B. C is an interior tube, through the sides of which are formed slots, into which the bodies of the cutters fit, and through which they project, as shown in fig. 2, so that as the interior tube is drawn inwards the cutter-heads will be drawn into the shallower parts of the dove-tailed slots, causing their cutting faces to project further inward. And as the interior tube is pushed outward the cutter-heads will be moved into the deeper parts of said grooves, drawing their cutting faces outward. This construction enables the die to be so adjusted as to cut screw-threads upon different-sized bolts or pipes. Upon the outer end of the cutter-seat A is formed a flange, $a'$, having a groove formed around the base of its outer surface, as shown in fig. 2. D is a band or nut fitting upon the end of the cutter-seat A, and having a flange, $d'$, fitting around the flange $a'$. Through the flange $d'$ are passed pins, the inner ends of which enter the groove in the flange $a'$, or enter shoes or circular pieces placed in said groove, so that the band D may be revolved upon the cutter-seat A without moving either forward or back. Upon the interior surface of the band or nut D is cut a screw-thread or its equivalent, fitting into a screw-thread or its equivalent cut upon the end of the interior tube C, so that by turning the band D in one or the other direction the cutters B may be expanded or contracted, according to the size of the bolt or pipe upon which the thread is to be cut. The pitch of the screw-thread cut upon the tube C and band D may be more or less steep, according as it is desired that the cutters B may be drawn in quick or slow, so that the die may be operated by machine or by hand, as may be desired or convenient. The end of the cutter-seat A and of the band D are squared off, so that they may be conveniently grasped by a wrench to operate them. If desired, the flange $a'$ may be formed near the outer edge of the end of the cutter-seat A. In this case the groove is formed upon its inner surface, and the flange $d'$ of the band D is fitted within the said flange $a'$, the pins or their equivalent being passed through the flange $d'$ from the inner side.

What I claim, and desire to secure by Letters Patent, is—

1. The combination of the dove-tailed cutters B, interior slotted tube C, and cutter-seat A with each other, substantially as herein shown and described, and for the purpose set forth.

2. The combination of the band or nut D with the cutter-seat A and the interior slotted tube C, substantially as herein shown and described, and for the purpose set forth.

The above specification of my invention signed by me this 17th day of April, 1867.

B. T. LOOMIS.

Witnesses:
WM. F. MCNAMARA,
JAMES T. GRAHAM.